United States Patent
Chen et al.

(10) Patent No.: US 11,307,983 B2
(45) Date of Patent: Apr. 19, 2022

(54) MAINTAINING DATA CONSISTENCY IN A MEMORY SUBSYSTEM THAT USES HYBRID WEAR LEVELING OPERATIONS

(71) Applicant: Micron Technology, Inc., Boise, ID (US)

(72) Inventors: Ning Chen, San Jose, CA (US); Jiangli Zhu, San Jose, CA (US); Ying Yu Tai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/247,373

(22) Filed: Dec. 9, 2020

(65) Prior Publication Data
US 2021/0096986 A1 Apr. 1, 2021

Related U.S. Application Data

(63) Continuation of application No. 16/123,979, filed on Sep. 6, 2018, now Pat. No. 10,891,224.

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/064* (2013.01);
(Continued)

(58) Field of Classification Search
CPC .......... G06F 3/061; G06F 3/064; G06F 3/065; G06F 3/0679
See application file for complete search history.

(56) References Cited

U.S. PATENT DOCUMENTS

| 10,248,333 B1 * | 4/2019 | Shah .................. G06F 12/1009 |
| 2007/0033376 A1 ‡ | 2/2007 | Sinclair ................. G06F 3/0605 |
| | | 711/203 |

(Continued)

*Primary Examiner* — Sean D Rossiter
(74) *Attorney, Agent, or Firm* — Lowenstein Sandler LLP

(57) ABSTRACT

A processing device in a memory sub-system maintains a mapping data structure to track data movements from a plurality of data management units associated with a media management operation on a memory device. The processing device further uses a first indicator and a second indicator of a plurality of indicators to indicate which data of data management units of a source group of data management units have been copied to a destination group of data management units during the media management operation. Data located in data management units preceding the first indicator have been copied to data management units of the destination group of data management units. Data located in data management units associated with the first indicator and the second indicator or between the first indicator and the second indicator are either copied to data management units of the destination group of data management units or remain located in data management units of the source group of data management units. Data located in data management units subsequent to the second indicator remain located in data management units of the source group of data management units and have not been copied to the destination group of data management units.

20 Claims, 9 Drawing Sheets

(52) U.S. Cl.
CPC ............ _G06F 3/065_ (2013.01); _G06F 3/0679_ (2013.01); _G06F 12/0292_ (2013.01); _G06F 2212/1036_ (2013.01); _G06F 2212/7201_ (2013.01); _G06F 2212/7211_ (2013.01)

(56) References Cited

U.S. PATENT DOCUMENTS

| | | | | |
|---|---|---|---|---|
| 2008/0282025 | A1‡ | 11/2008 | Biswas | G06F 12/0246 711/103 |
| 2010/0077136 | A1‡ | 3/2010 | Ware | G06F 12/0246 711/103 |
| 2015/0106557 | A1‡ | 4/2015 | Yu | G11C 16/3431 711/103 |
| 2015/0177996 | A1‡ | 6/2015 | Chang | G11C 29/4401 711/103 |
| 2018/0129423 | A1‡ | 5/2018 | Amato | G06F 11/1076 |
| 2018/0357165 | A1* | 12/2018 | Helmick | G06F 12/0246 |
| 2019/0310780 | A1‡ | 10/2019 | Gholamipour | G06F 12/1009 |
| 2019/0340134 | A1‡ | 11/2019 | Haswell | G06F 12/1054 |

\* cited by examiner
‡ imported from a related application

MAINTAINING DATA CONSISTENCY IN A MEMORY SUBSYSTEM THAT USES HYBRID WEAR LEVELING OPERATIONS

RELATED APPLICATIONS

This application is a continuation of U.S. patent application Ser. No. 16/123,979, filed Sep. 6, 2018, the entire contents of which are hereby incorporated by reference herein.

TECHNICAL FIELD

Embodiments of the disclosure relate generally to memory sub-systems, and more specifically, relate to maintaining data consistency in a memory sub-system that uses hybrid wear leveling operations.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific embodiments, but are for explanation and understanding only.

DETAILED DESCRIPTION

Figure 1:
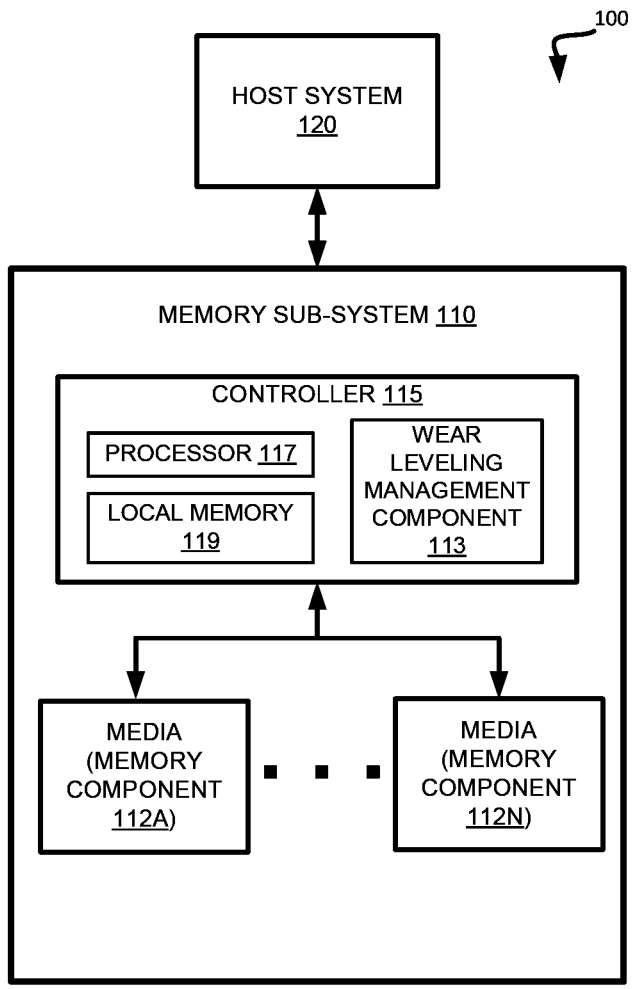
FIG. 1 illustrates an example computing environment that includes a memory system, in accordance with some implementations of the disclosure.

Aspects of the present disclosure are directed to maintaining data consistency in a memory sub-system that uses hybrid wear leveling operations. A memory sub-system is also hereinafter referred to as a "memory device." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory components used by the memory sub-system can have particular properties that provide challenges in the operation of the memory sub-system. For example, some memory components, such as non-volatile memory components, have limited endurance. The individual segments, data units, or blocks of the memory components can be written, read, and/or erased only a finite number of times before physical wear causes the memory components to fail. To counteract this limited endurance of memory components, techniques have been developed to manage wear on the memory components.

One technique of managing the endurance in a conventional memory sub-system is wear leveling. A wear leveling operation can attempt to evenly distribute the read, write and erase operations, and thus the corresponding physical wear, across the memory components. One memory component can be divided into some number of individual data units, such as pages or blocks of the memory component, which each experiences physical wear. These data units can represent an individual segment of the memory component that can be written or erased in a single operation. Write counts (e.g., the number of times a write operation that writes data to a data unit is performed on the data unit during the lifetime of the data unit), read counts (e.g., the number of times a read operation that reads data from a data unit is performed on the data unit during the lifetime of the data unit), or erase counts (e.g., the number of times an erase operation that erases data from a data unit is performed on the data unit during the lifetime of the data unit) can be strong indicators of wear on the data units of memory components. Thus, conventional wear leveling techniques often use a sorting process to find data units with high read or write counts and data units with low read count or write counts. The data from a data unit having a high read or write count can be swapped with the data of a data unit having a low read or write count in an attempt to evenly distribute the wear across the data units of the memory component.

Different types of memory components can include varying numbers of data units. For example, a cross-point array of non-volatile memory cells can have a significantly smaller data unit size than a flash-based memory component, and thus can have a significantly larger number of data units for a memory component of similar capacity. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Thus, such memory components can perform "in-place" data replacement. Since the number of data units in such a memory component is large, a significant amount of computing resources (e.g., processing and memory resources) are used to retrieve, store, and sort various count values associated with the memory component. Additionally, retrieving, storing, and sorting the large number of data units takes a proportionately large amount of time, which contributes significantly to latency of the memory sub-system.

Further, wear leveling techniques can lead to race conditions when the memory sub-system is internally issuing commands to move data blocks in a memory component and a host system requests access to the data. If not handled properly, the race conditions can cause data inconsistency. For example, the memory sub-system can move data from a first data block to a second data block, and the host system can request access to the data that the host system expects to be stored at the first data block. If the data returned to the host system is not what the host system is expecting due to data being moved to a different location by the wear leveling operation, then there can be undesirable effects to system behavior and/or unsatisfied users of the memory sub-system as the requested data is not returned to the host system.

Aspects of the disclosure address the above and other deficiencies by implementing maintenance of data consistency in a memory sub-system that uses hybrid wear leveling operations. In one implementation, hybrid wear leveling utilizes a hierarchy of levels of data units having different sizes. For example, a first level can represent individual data units, such as a data block or page of a memory component (which can also be referred to as a data management unit (DMU) or a management unit (MU)), while a second level can represent a group of multiple data units or data blocks (which can also be referred to as a super management unit (SMU), super block, or a group of data management units).

Wear leveling can be performed at each level of the hierarchy using different wear leveling techniques and frequencies. For example, hybrid wear leveling can include wear leveling at the first level (intra-SMU wear leveling) using direct algebraic mapping after a certain number of host writes to a DMU, or a period of time elapses, and wear leveling at the second level (inter-SMU wear leveling) using indirect fully associative mapping implemented by a mapping data structure (e.g., look-up table) after a threshold difference is satisfied between the SMU with the highest write count (where the SMU write count is the sum of the DMU write counts) and the SMU with the lowest write count, or a period of time elapses.

In certain types of memory, over-provisioning provides more physical blocks than the logical capacity. Thus, intra-SMU wear leveling can include moving data from a DMU where the data is stored in an SMU to a DMU that is empty in the SMU. The former DMU becomes empty and the latter DMU stores data. Likewise, inter-SMU wear leveling can include swapping all of the DMUs of a SMU that is mapped (e.g., storing data) to the DMUs of an SMU that is free (e.g., not mapped and not storing data). The former SMU becomes a free SMU and the latter SMU becomes a mapped SMU. In some embodiments, one DMU of an SMU can be moved to another SMU at a time, while in other embodiments, multiple DMUs of an SMU can be concurrently moved to another SMU.

Advantages of the present disclosure include, but are not limited to, the increased performance of the memory sub-system as latency for performing write operations can be reduced as the amount of time to perform wear leveling operations is reduced. For example, the use of the hybrid wear leveling allows the maintenance of data consistency in the memory sub-system while allowing for efficient and effective wear leveling in memory sub-systems having high numbers of data units. The processing and memory resources utilized for wear leveling, as well as data access latencies, are reduced, while the wear (e.g., number of operations performed on a memory component and/or an amount of data written to the memory component) on the multiple memory components of the memory sub-system can be more evenly distributed, preventing the premature failure of a particular memory component of a memory sub-system relative to the other memory components of the memory sub-system.

In some embodiments, before, during, or after the wear leveling operation executes, the f data consistency can be maintained in view of any potential race conditions that arise when a host system requests access to the data in the memory sub-system. For example, one or more indicators in a mapping data structure can be used to track which data has been copied from a source SMU to a destination SMU. The indicators can be moved in the mapping data structure and mapped to either the source SMU or the destination SMU to enable determining which physical block address to return to the host system when the host system requests access to data. In addition, the disclosed techniques enable returning the correct physical block address when the data is moved between DMUs within an SMU by using one or more pointers within the SMU and a direct mapping function.

Further, in some embodiments, a state machine can be used to track the state of the various wear leveling operations and associated addresses for DMUs involved in the wear leveling operations. When there are writes from the host system to the DMUs, the addresses associated with the writes can be checked and the state of any wear leveling operation using those addresses can be adjusted to enable the write from the host system to proceed. The internal commands can be retried or canceled. In this way, the techniques described herein do not block host system commands or internal commands by the memory sub-system. The use of the state machine to check states of wear leveling operations at specific addresses to enable host system commands to proceed can be referred to as a lock scheme. Advantages of the present disclosure can further include improved performance as correct physical addresses are returned when performing the hybrid wear leveling operations and maintaining data consistency using the lock scheme.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is an SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a wear leveling management component 113 that can be used to implement fine granularity data management to maintain data consistency when performing the hybrid wear leveling operations across the memory components 112A to 112N. In some embodiments, the controller 115 includes at least a portion of the wear leveling management component 113. For example, the controller 115 can include a processor 117 (processing device) configured to execute instructions stored in local memory 119 for performing the operations described herein. In some embodiments, the wear leveling management component 113 is part of the host system 120, an application, or an operating system.

The wear leveling management component 113 can maintain data consistency when performing the hybrid wear leveling operations across the memory components 112A to 112N. The wear leveling operations performed can include intra-SMU wear leveling and inter-SMU wear leveling. In some embodiments, the data stored at DMUs of one SMU can be moved to another SMU at a time. The wear leveling management component 113 can track which DMUs are moved from a source SMU to a destination SMU using indicators in a mapping data structure. The mapping data structure can include entries having logical block addresses and logical indices. The mappings of the entries can be split between the DMUs of the source SMU and the destination SMU. The indicators can be located at current DMUs that are being moved and the indicators can be moved to subsequent entries associated with DMUs in the source SMU to track the progress of moving the data. These indicators can be used to determine what physical address of the source SMU or the destination SMU to return to a host system when the host system requests access to the data. Accordingly, the correct physical address can be returned when the data is being moved between SMUs before, during, or after wear leveling operations after performed.

Also, the wear leveling component 113 can use a state machine to maintain states of the wear leveling operations being performed on the DMUs of the SMU and the associated addresses that are involved in the wear leveling operations. When a host system performs writes to certain addresses, conflicts can be identified in a data structure that stores the addresses, states, and wear leveling operation that is being performed. If there is a conflict, the state of the wear leveling operation can be modified to enable the host system operation to proceed. Accordingly, there is no blocking of host system commands or of internal commands related to wear leveling operations. Further details with regards to the operations of the hybrid wear leveling management component 113 are described below.

In implementations, a wear leveling operation can include an operation that prolongs the service life of memory components 112A-112N (generally referred to as "memory component(s) 112" herein). For example, a wear leveling operation can attempt to evenly distribute the physical wear across the set of data units of memory components 112. A data unit can refer to an amount of physical memory of memory components 112.

Figure 2:
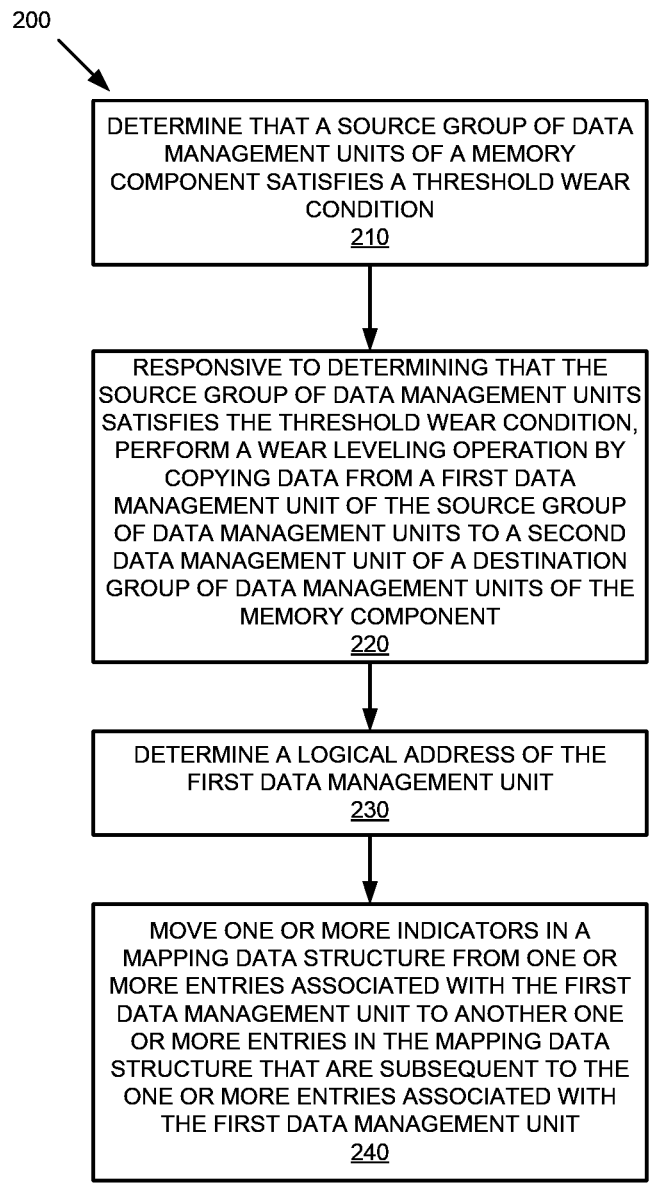
FIG. 2 is a flow diagram of an example method for performing a wear leveling operation and using an indicator in a mapping data structure to access data requested by a host system at a source group of data management units or at a destination group of data management units, in accordance with some embodiments of the present disclosure.

FIG. 2 is a flow diagram of an example method 200 for performing a wear leveling operation and using an indicator in a mapping data structure to access data requested by a host system at a source group of data management units or at a destination group of data management units, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the wear leveling management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, the processing device determines that a source group of data management units of a memory component 112A satisfies a threshold wear condition. In some instances, the threshold condition can include determining that a summed number of write operations associated with the DMUs of an SMU exceeds a threshold number, a highest number of summed write operations associated with DMUs of an SMU that is mapped (e.g., is storing data) is larger than a lowest number of summed write operations associated with DMUs of another SMU that is mapped (e.g., is storing data) by a threshold difference, or the like.

At block 220, responsive to determining that the source group of data management units satisfies the threshold wear condition, the processing device performs a wear leveling operation by copying data from a first data management unit of the source group of data management units to a second data management unit of a destination group of data management units of the memory component 112A. The wear leveling operation can be inter-SMU wear leveling described above. Once the data is copied to the second data management unit, the data at the first data management unit of the source group of data management unit can be erased.

At block 230, the processing device determines a logical address of the first data management unit. The logical block address can be stored in an entry of a mapping data structure (e.g., look-up table) and associated with a logical index. Each entry in the mapping data structure can be mapped to a physical location (e.g., physical block address) of a data management unit of the source group of data management units prior to the data of the data management units being copied to the destination group of data management units. Responsive to copying the data from the first data management unit of the source group of data management units to the second data management unit of the destination group of data management units, the processing device can update, in the mapping data structure, a logical index associated with the data of the first data management unit to reference a physical location of the second data management unit of the destination group of data management units.

At block 240, the processing device moves one or more indicators in a mapping data structure from one or more entries associated with the first data management unit to another one or more entries in the mapping data structure that are subsequent to the one or more entries associated with the first data management unit. The one or more indicators track the progress of moving the data from the source group of data management units to the destination group of data management units. Accordingly, the one or more indicators are used to access data requested by the host system at the source group of data management units or at the destination group of data management units. The logical indices of the one or more entries associated with the first data management unit can be updated to point to one or more physical locations of the second data management unit of the destination group of data management units.

In some embodiments, data from a single data management unit of the source group of data management units can be copied to the destination group of data management units at a time using the wear leveling operation. When the wear leveling operation is performed on the single data management unit at a time, a single indicator can be used to track which data of the data management units in the source group of data management units have been copied to the destination group of data management units. Data located in data management units preceding the single indicator have been copied to data management units of the destination group of data management units. Data located in data management units associated with or subsequent to the single indicator are still located in data management units of the source group of data management units and have not been copied to the destination group of data management units.

In some embodiments, data from multiple data management unit of the source group of data management units can be concurrently copied to the destination group of data management units at a time using multiple instances of the wear leveling operation. When the wear leveling operation is performed concurrently on data from a plurality of data management units, a first indicator and a second indicator can be used to track which data of data management units of the source group of data management units have been copied to the destination group of data management units. Data located in data management units preceding the first indicator have been copied to data management units of the destination group of data management units. Data located in data management units associated with the first indicator and the second indicator or between the first indicator and the second indicator are either copied to data management units of the destination group of data management units or remain located in data management units of the source group of data management units. The processing device can set a flag associated with the entries in the mapping data structure when the data is successfully copied to the destination group of data management units. As such, when a host system requests to access the data, the processing device can determine whether the data located in the data management units associated with or between the first indicator and the second indicator have completed copying to the destination group of data management units based on respective flags associated with the data. Data located in data management units subsequent to the second indicator remain located in data management units of the source group of data management units and have not been copied to the destination group of data management units.

In some embodiments, intra-SMU wear leveling can be executed while the inter-SMU wear leveling is being performed. Thus, the processing device can perform a second wear leveling operation (intra-SMU wear leveling) to rotate data between data management units in the destination group of data management units using a direct mapping function including a linear function utilizing a base pointer value and a free pointer value, which is discussed further below.

The processing device can receive a request from the host system 120 to access the data that is copied to the second data management unit in the destination group of data management units. The request can include a logical data management unit address associated with the data. The processing device can translate the logical data management unit address of the data to a physical address of the destination group of data management units. The processing device can identify the base pointer value and the free pointer value associated with respective data management units of the destination group of data management units using the physical address of the destination group of data management units. The processing device can return a physical address of the second data management unit of the destination group of data management unit that is storing the data based on the base free pointer value and the free pointer value.

In some embodiments, the processing device can use the physical address of the data management unit at which the data is stored to determine a state of the one or more wear leveling operations that are being performed in response to a write operation to the logical block address associated with the data from the host system. The state can be maintained by a state machine and stored in a data structure, as discussed further below. If there is a conflict at the address between the state associated with the wear leveling operation and the write operation, the processing device can modify the state of the wear leveling operation to enable the write operation from the host system to process.

Figure 3A:
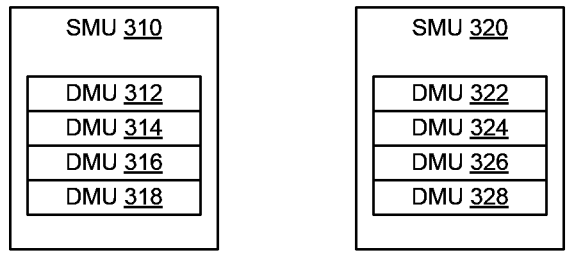
FIG. 3A illustrates different levels of hierarchical data units in a memory component, in accordance with some implementations of the disclosure.

FIG. 3A illustrates different levels of hierarchical data units in memory components 112. Data management units (DMUs) are one example of a data unit. For example, a data management unit can be a page (e.g., smallest unit of data that can be written to or read from a cross-point array) of a cross-point array of non-volatile memory or a data block (e.g., smallest unit of data that can be erased in flashed-based memory) of flash-based memory. Super management units (SMUs) are another example of data units, and can include a group of data multiple management units (e.g., 1000 DMUs). The group of data management units can be the data units that make up the one or more memory components 112. For example, the group of data management units of memory components 112 can be all or a majority of the pages or data blocks of memory components 112. FIG. 3A illustrates an example of two super management units 310 and 320. Super management unit 310 includes a number of data management units 312, 314, 316, and 318. Super management unit 320 also includes a number of data management units 322, 324, 326, and 328. Only a limited number of data management units are illustrated, but in practice there can be any number of super management units, each containing any number of data management units (e.g., 500, 1000, 2000).

In one embodiment, hybrid wear leveling management component 113 can perform wear leveling at each level of the hierarchy using different wear leveling techniques. For example, hybrid wear leveling management component 113 can perform intra-SMU wear leveling among the management units 312, 314, 316, and 318 of super management unit 310 or the data management units 322, 324, 326, and 328 of super management unit 320 using direct algebraic mapping. Furthermore, hybrid wear leveling management component 113 can perform inter-SMU wear leveling among the super management units 310 and 320 themselves, using indirect fully associative mapping implemented by a mapping data structure.

In some implementations, a wear leveling operation can rewrite data of a data unit having a high wear metric to another data unit having a lower wear metric, or vice versa (e.g., rewrite data of a data unit having a low wear metric to another data unit having a higher wear metric). In implementations, a wear metric can be indicative of a level of physical wear on a data unit. Some examples of wear metrics can include write count, read count, or a combination of write count and read count.

In some implementations, a wear metric can include a combination of a write count and a read count. For example, the wear metric can include both the write count and the read count for a particular data unit where the write count and read count are combined using one or more equations. The physical wear on a data unit caused by a read operation can be less than the physical wear caused by a write operation. To combine the read count and write count for a data unit, the read count or write count for a data unit can be normalized (e.g., adjusting counts measured by different scales to a common scale) by weighting the write count or the read count. For instance, a read count for a data unit can be multiplied by a fraction (e.g., 0.8) to determine the equivalent number of write counts that the read counts represents in terms of wear. The weighted read count and the write count for the data unit can be combined (e.g., added) and be used as a wear metric indicative of the physical wear on the particular data unit.

In some implementations, memory components 112 can include non-volatile memory devices, such a non-volatile memory devices that include a cross-point array of non-volatile memory cells. As noted above, a cross-point array of non-volatile memory can perform bit storage based on a change of bulk resistance, in conjunction with a stackable cross-gridded data access array. Additionally, in contrast to many flash-based memories that perform write out-of-place operations (e.g., data at location that is to be written is erased before other data can be programmed to the location), cross-point non-volatile memory can perform a write in-place operation, where a non-volatile memory cell can be programmed without the non-volatile memory cell being previously erased. It can be noted that the wear metrics for cross-point non-volatile memory may not include an erase count due to the ability of the cross-point non-volatile memory to perform write in-place operations. An erase count can be a value indicating the number of times a memory operation, such as an erase operation that erases data of a data unit, is performed on the data unit during the lifetime of the data unit. Aspects of the disclosure can be applied to other types of non-volatile memory devices or other types of memory devices.

Figure 3B:
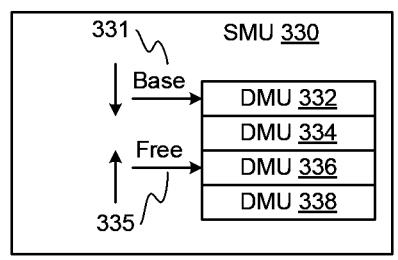
FIG. 3B illustrates intra-SMU wear leveling to be performed using direct algebraic mapping, in accordance with some implementations of the disclosure.

FIG. 3B illustrates intra-SMU wear leveling to be performed using direct algebraic mapping, in accordance with some implementations of the disclosure. In one embodiment, an algebraic function can be used to determine an appropriate physical location to which data can be moved in the wear leveling operation (e.g., Fn(Logical DMU Index) =Physical DMU Index). Depending on the embodiment, the direct mapping function can include at least one of a swap function, a circular shift function, a linear function utilizing a base pointer value and a free pointer value, or some other appropriate function. The function can result in a direct mapping of a logical index to a new physical location in the super management unit 330. In one embodiment, wear leveling management component 113 maintains a base pointer value 331 and a free pointer value 335 for super management unit 330 including data management units 332, 334, 336, and 338. The base pointer value 331 indicates the location of the beginning of the super management unit 330 (i.e., the location of the first data management unit 332). The free pointer value 335 indicates the location of an available space for data storage within the super management unit 330 (i.e., the location of the management unit 336). In one embodiment, wear leveling management component 113 increments the free pointer value 335 after every N_free writes, where N_free can be a fixed number, a random number or a pseudo-random number. Wear leveling management component 113 further decrements the base pointer value 331 after every N_base steps, where N_base represents the size of super management unit 330. Thus, in one embodiment, the direct mapping function can be represented as:

if (Logical DMU Index+Base Pointer) mod SMU Size>Free Pointer,

Physical DMU Index=(Logical DMU Index+Base Pointer) mod SMU Size;

else,

Physical DMU Index=(Logical DMU Index+Base Pointer) mod SMU Size+1

In some embodiments, Logical DMU Index can be a logical value indicating a location of the DMU in a mapping data structure (e.g., table) and Physical DMU Index can be a value associated with an address of a physical location of the DMU in the super management unit 330.

Figure 3C:
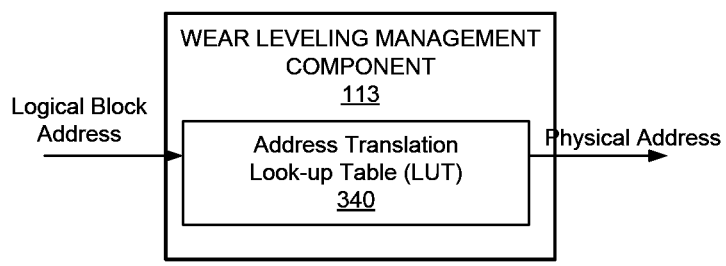
FIG. 3C illustrates inter-SMU wear leveling to be performed using indirect mapping, in accordance with some implementations of the disclosure.

FIG. 3C illustrates inter-SMU wear leveling to be performed using indirect mapping, in accordance with some implementations of the disclosure. With indirect mapping, additional information is used to determine the target physical location on the memory component 112. In one embodiment, wear leveling management component 113 copies data from the super management unit to an available physical location on the memory component 112. The available physical location can be determined in any number of ways, such as a location having a lowest write count, a location having been least recently accessed, etc. A list of available locations can be maintained in a free pool stored in local memory 119. Upon copying the data, wear leveling management component 113 records a mapping of a logical index and a logical block address associated with the data from the super management unit to the available physical index in an entry in a mapping data structure (e.g., look-up table 340). In one embodiment, the look-up table 340 is included in the wear leveling management component 113 and/or is maintained in local memory 119 of controller 115. Thus, when the logical block address and/or the logical index is applied to look-up table 340, the corresponding physical address is output. In other embodiments, the mapping can be maintained in some other type of data structure, such as an array, linked list, etc. One or more indicators can be associated with the entries in the mapping data structure that are mapped to the data management units of source super management unit from which data is being copied, as illustrated below.

Figure 4A:
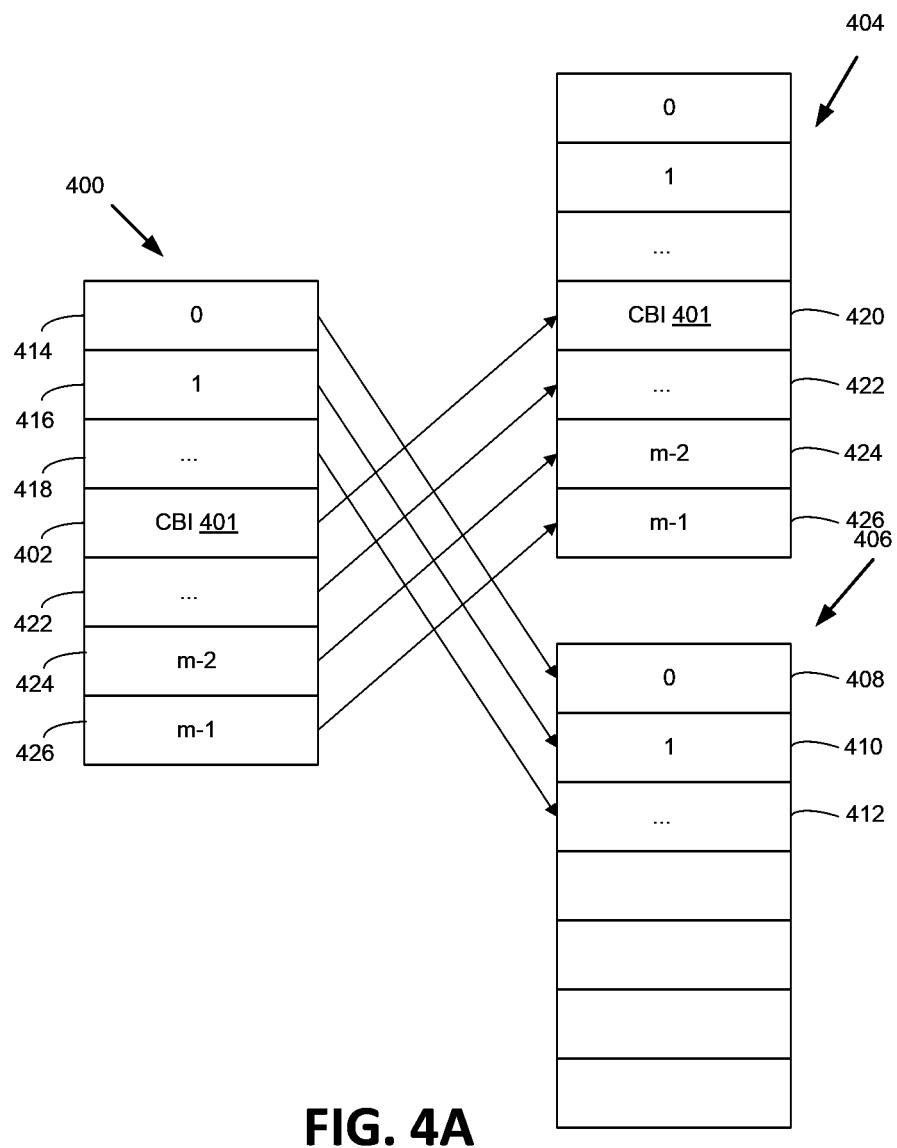
FIG. 4A illustrates inter-SMU wear leveling using a mapping data structure including an indicator to track movement of data of a single data block from a source SMU to a destination SMU, in accordance with some embodiments of the present disclosure.

FIG. 4A illustrates inter-SMU wear leveling using a mapping data structure 400 including an indicator 401 ("current block index (CBI)") to track movement of data of a single data block from a source SMU 404 to a destination SMU 406, in accordance with some embodiments of the present disclosure. When data is copied from one data management unit at a time, only the single indicator 401 can be used to track the progress of the movement of the data. Data located in data management units preceding the single indicator 401 have been copied to data management units of the destination SMU 406, and data located in data management units associated with or subsequent to the single indicator 401 are still located in data management units of the source SMU 404 and have not been copied to the destination SMU 406.

For example, the processing device can detect that a threshold wear condition for the source SMU 404 is satisfied based on one or more wear metrics. As a result of the threshold wear condition being satisfied, the processing device can copy data from data management units of the source SMU 404 one at a time. As depicted, data associated with logical index "0", "1", and " . . . " have been copied to data management units 408, 410, and 412 of the destination SMU 406. After data is copied to the data management units 408, 410, and 412, the data can be erased from corresponding data management units in the source SMU 404. Also, entries 414, 416, and 418 in the mapping data structure 400 can be updated so their logical indices and/or logical block addresses map to physical locations of the data management units 408, 410, and 412 at the destination SMU 406.

The indicator 401 is moved to an entry 402 subsequent to the last data block that was moved. Thus, the indicator 401 is located at entry 402 that is after the entry 418 that includes the logical index " . . . ". The indicator 401 is mapped to a respective data management unit 420 in the source SMU 404 whose data is to be copied next. The data located in data management units 420, 422, 424, and 426 of the source SMU 404 that are associated with the indicator 401 or subsequent to the indicator 401 are still located in the source SMU 404 and have not been copied to the destination SMU 406. Accordingly, the entries 402, 422, 424, and 426 remain mapped to data management units 420, 422, 424, and 426, respectively, at the source SMU 404.

As a result of entries 414, 416, and 418 being mapped to the destination SMU 406 and other entries 402, 422, 424, and 426 being mapped to the source SMU 404, there is a split mapping of logical addresses to physical addresses. When the host system 120 requests to access data using a logical block address and/or a logical index associated with the data, the processing device can use the split mapping included in the mapping data structure 400 to determine the physical location of the data management unit at which the data is stored in the source SMU 404 or the destination SMU 406 in view of the indicator 401.

Figure 4B:
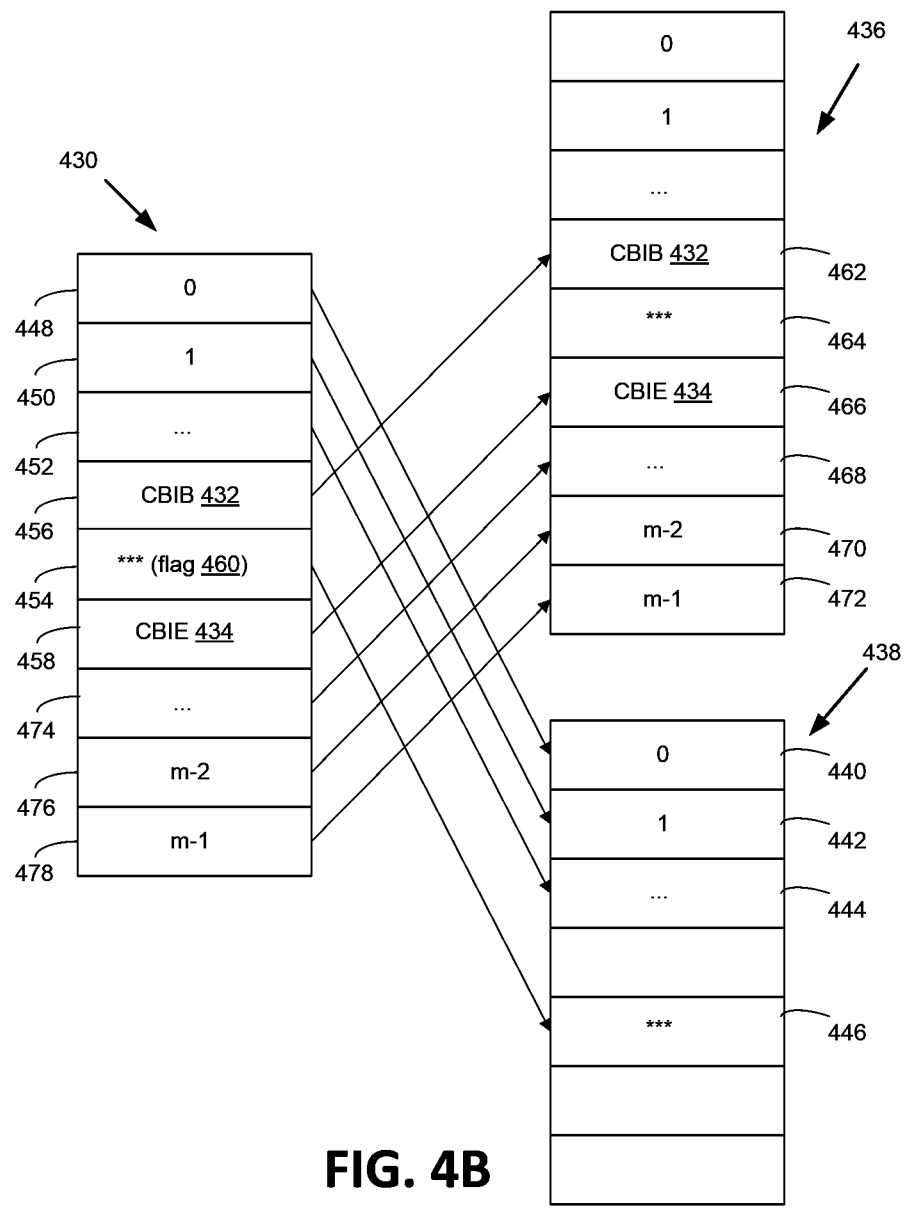
FIG. 4B illustrates inter-SMU wear leveling using a mapping data structure including two indicators to track concurrent movement of data of multiple data blocks from a source SMU to a destination SMU, in accordance with some embodiments of the present disclosure.

FIG. 4B illustrates inter-SMU wear leveling using a mapping data structure 430 including a first indicator 432 ("current block index beginning (CBIB)") and a second indicator 434 ("current block index ending (CBIE)") to track concurrent movement of data of multiple data management units from a source SMU 436 to a destination SMU 438, in accordance with some embodiments of the present disclosure. Moving the data in concurrent batches can improve the speed of the inter-SMU wear leveling operation. When data is concurrently copied from multiple data management units (e.g., 5, 10, 15, 20, etc.) at a time, the two indicators 432 and 434 can be used to track the progress of the movement of the data. Data located in data management units preceding the first indicator 432 have been copied to data management units of the destination SMU 438. Data located in data management units associated with the first indicator 432 and 434, or between the first indicator 432 and the second indicator 434 are either copied to data management units of the destination SMU 436, are in the process of being copied to the destination SMU 436, or remain located at data management units of the source SMU 436. Data located in data management units subsequent to the second indicator 434 remain located in data management units of the source SMU 436 and have not been copied to the destination SMU 438.

For example, the processing device can detect that a threshold wear condition for the source SMU 436 is satisfied based on one or more wear metrics. As a result of the threshold wear condition being satisfied, the processing device can copy data from multiple data management units of the source SMU 436 at a time. As depicted, data associated with logical index "0", "1", " . . . ", and "***" have been copied to data management units 440, 442, 444, and 446 of the destination SMU 438. After data is copied to the data management units 440, 442, 444, and 446, the data can be erased from corresponding data management units in the source SMU 436. Also, entries 448, 450, 452, and 454 in the mapping data structure 430 can be updated so their logical indices and/or logical block addresses map to physical locations of the data management units 440, 442, 444, and 446, respectively, at the destination SMU 438.

It should be noted that an entry 456 associated with the first indicator 432 and an entry 458 associated with the second indicator 434, as well as entries 454 in between the first indicator 432 and the second indicator 434, can be in the process of being moved to the destination SMU 438. The processing device can set a flag 460 for these entries 454 when the data is successfully copied to a respective data management unit 446 at the destination SMU 438. A flag array can be used to store the various flags for the concurrently moving data management units. The size of the flag array can be determined by the number of concurrent moving data management unit and each flag can be a single bit.

Once all flags are set for the entries 432, 454, and 434 that are associated with concurrently moving data management units, the first indicator 432 can be moved to an entry immediately subsequent to the second indicator 434, and the second indicator 434 can be moved to an entry subsequent to the new location of the first indicator 432. The processing device can begin copying the data from data management units mapped to the entries associated with and/or between the first indicator 432 and 434.

During a last concurrent batch of wear leveling operations, the first indicator 432 was located at the entry 448 associated with logical index "0" and the second indicator 434 was located at the entry 452 associated with logical index " . . . ". After logical indices "0", "1", and " . . . " were copied to data management units 440, 442, and 444, the first indicator 432 was moved to the entry 456 subsequent to the last entry 452 whose data was successfully copied in the previous concurrent batch, and the second indicator 434 was moved to an entry 458 subsequent to the first indicator 432.

In the current concurrent batch of wear leveling operations, data associated with entries 456, 454, and 458 are to be copied from the source SMU 436 to the destination SMU 438. Thus, the first indicator 432 is located at entry 456 that is after the entry 452 that includes the logical index " . . . ". The first indicator 432 is mapped to a respective data management unit 462 in the source SMU 404 whose data is to be copied next. The second indicator is mapped to a respective data management unit 466 in the source SMU 436 whose data has not yet been copied to the destination SMU 438. The data associated with logical index "*" is successfully copied to the data management unit 446, and thus, the flag 460 is set in the mapping data structure 430. Further, the logical index "*" and/or the logical block address associated with the entry 454 is mapped to the physical location of the data management unit 446 associated with the logical index "***". Further, data in data management units 468, 470, and 472 that are subsequent to the second indicator 434 are still located in the source SMU 436 and have not been copied to the destination SMU 438.

The data located in data management units 462, 466, 468, 470, and 472 of the source SMU 404 that are associated with the first indicator 432 and the second indicator 434 or subsequent to the second indicator 434 are still located in the source SMU 436 and have not been copied to the destination SMU 438. Accordingly, the entries 456, 458, 474, 476, and 478 remain mapped to data management units 462, 466, 468, 470, and 472, respectively, at the source SMU 436.

As a result of some entries 448, 450, 452, and 454 being mapped to the destination SMU 438 and some entries 456, 458, 474, 476, and 478 being mapped to the source SMU 436, there is a split mapping of logical addresses to physical addresses. When the host system 120 requests to access data using a logical block address and/or a logical index associated with the data, the processing device can use the split mapping included in the mapping data structure 400 to determine the physical location of the data management unit at which the data is stored in the source SMU 404 or the destination SMU 406 in view of the first indicator 432, the second indicator 434, and/or the flags 460.

Once the data associated with the first indicator 432 and the second indicator 434 or between the first indicator 432 and the second indicator 434 is copied to the destination SMU 438, the first indicator 432 and the second indicator 434 will be moved again. Using the first indicator 432, the second indicator 434, and the flag 460 can enable providing the correct physical address to the host system 120 when wear leveling operations are being performed to move data between the source SMU 436 and the destination SMU 438.

Figure 5:
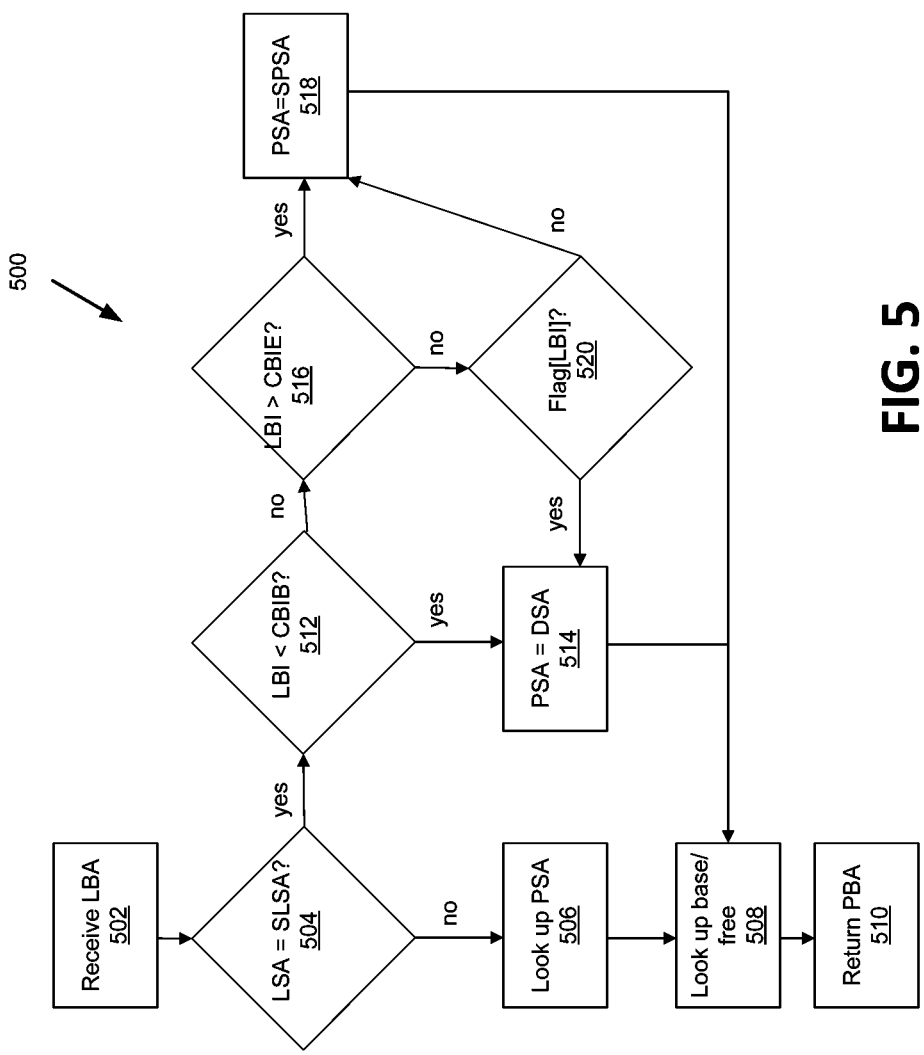
FIG. 5 is a flow diagram of an example method for translating a logical block address to a physical data management unit address of either a source SMU or a destination SMU, in accordance with embodiments of the present disclosure.

FIG. 5 is a flow diagram of a method 500 of translating a logical block address to a physical data management unit address of either a source SMU or a destination SMU, in accordance with embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the wear leveling management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 502, the processing device receives a logical block address (LBA) from the host system 120 requesting access (e.g., read, write, or erase) to data associated with the logical block address. At block 504, the processing device determines whether the logical superblock address associated with the logical block address is the same as the source logical superblock address. If not, at block 506, the processing device identifies a physical superblock address associated for a destination logical superblock address associated with the logical block address. At block 508, the processing device identifies the base pointer value and the free pointer value using the physical source address. The base pointer value and the free pointer value can change as they are moved around data management units in a SMU during intra-SMU wear leveling, and identifying their respective value can enable identifying a specific data management unit where data is located in the SMU. For example, a physical block address of a data management unit can be obtained using the base pointer value and the free pointer value using one or more algebraic functions, as described further below.

If the logical superblock address associated with the logical block address is the same as the source logical superblock address, at block 512, the processing device determines whether the logical block index (e.g., logical value in the mapping data structure) is less than the first indicator (CBIB). In other words, the processing device determines whether the logical value of the logical block address being requested precedes the first indicator. If so, then the data has already been copied to the destination SMU and the processing device sets the physical superblock address to the destination superblock address at block 514. At block 508, the processing device looks up the base pointer value and the free pointer value using the physical superblock address. At block 510, the processing device determines the physical block address using the base pointer value and the free pointer value and returns the physical block address.

If the processing device determines that the logical block index is not less than the first indicator (CBIB), then, at block 516, the processing device determines whether the logical block index is greater than the second indicator (CBIE). In other words, the processing device determines whether the logical value of the logical block address being requested is subsequent to the second indicator. If so, then the data has not been copied to the destination SMU and is still located at data management units of the source SMU. Accordingly, at block 518, the processing device sets the physical superblock address equal to the source physical superblock address. At block 508, the processing device looks up the base pointer value and the free pointer value using the physical superblock address. At block 510, the processing device determines the physical block address using the base pointer value and the free pointer value and returns the physical block address.

If the LBI is in between the greater than or equal to the CBIB and less than or equal to the CBIE, then data is part of a concurrent batch of wear leveling operations and can be present at the source SMU, in the process of being copied to the destination SMU, or already copied to the destination SMU. Accordingly, at block 520, the processing device determines whether the flag is set for the logical block index associated with the logical block address being requested. If the flag is set, then the data has been copied to the destination SMU, and at block 514, the processing device sets the physical superblock address to the destination superblock address. At block 508, the processing device looks up the base pointer value and the free pointer value using the physical superblock address. At block 510, the processing device determines the physical block address using the base pointer value and the free pointer value and returns the physical block address.

If the flag is not set, then the data has not been copied to the destination SMU yet, and at block 518, the processing device sets the physical superblock address equal to the source physical superblock address. At block 508, the processing device looks up the base pointer value and the free pointer value using the physical superblock address. At block 510, the processing device determines the physical block address using the base pointer value and the free pointer value and returns the physical block address.

To determine the physical block address (PBA), the processing device can calculate the logical block index (LBI) using the following function:

$$LBI = LBA \% m$$

In some embodiments, 'm' is the size of a superblock (e.g., the number of DMUs in a superblock) and LBA is the logical block address. The processing device can determine a direct block index (DBI) using the following function:

$$DBI = (\text{base pointer value} + LBI)$$

After determining the DBI, the processing device can determine a physical block index (PBI) using the following function:

PBI=(DBI<(free pointer value<base pointer value?
    (free pointer value+m'):free pointer value)?DBI:
    DBI+1)%m'

In some embodiments, m' is the size of the superblock plus 1. The physical block address (PBA) is a combination of the physical superblock address (PSA) and the PBI, assuming the capacity of physical superblock is m' where m'>m. The PBA can be determined using the following function:

PBA=PSA*m'+PBI

Figures 6A, 6B:
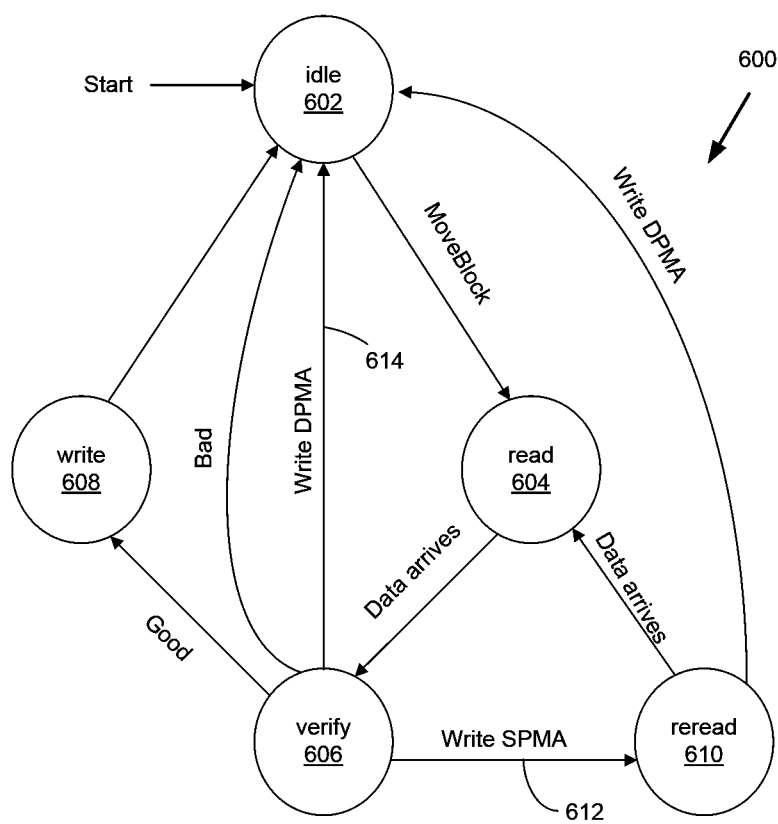
FIG. 6A illustrates a state machine diagram for handling requests from a host system when performing a wear leveling operation, in accordance with some embodiments of the present disclosure.
FIG. 6B illustrates a state data structure used to maintain a state of the wear leveling operation, in accordance with some embodiments of the present disclosure.

FIG. 6A illustrates a state machine diagram 600 for handling requests from the host system 120 when performing a wear leveling operation, in accordance with some embodiments of the present disclosure. The states can be associated with the wear leveling operation and the various states include an idle state 602, a read state 604, a verify state 606, a write state 608, and a reread state 610. The wear leveling operation can be in the idle state 602 when the wear leveling operation is not currently executing. Once the wear leveling operation commences, a MoveBlock command can be issued either during inter-SMU wear leveling or intra-SMU wear leveling. For example, the MoveBlock command can correspond to moving a data block from one SMU to another SMU in inter-SMU wear leveling or to moving a data block from one location to another location within an SMU in intra-SMU wear leveling.

Upon the MoveBlock command issuing, the state of the wear leveling operation can transition to the read state 604 where the processing device reads the data from a source data management unit. After the data is read, the state can transition to the verify state 606. During this state, a locking mechanism can be used to modify the state if the host system 120 issues a write command associated with the source or destination address associated with the data. If the data read is verified, and there are no intervening events (e.g., writes from the host system 120), then the state transitions to the write state 608 and the data is written to a destination data management unit (e.g., either in the same SMU as the source data management unit or in a different SMU). Then, the state transitions back to the idle state 602. If the data read is not verified (e.g., data is bad, faulty, erroneous, corrupt), then the data is not written to the destination and the state transitions back to the idle state 602.

However, a write operation from the host system 120 to the source address invalidates the read, and a write operation from the host system 120 to the destination supersedes the internal write command by the wear leveling operation. The lock mechanism can be used during the verify state 606 to allow the write by the host system 120 to process and to modify the state of the wear leveling operation. For example, during the verify state 606, if the host system 120 writes to the source physical memory address (612), then the lock mechanism allows the host system 120 to write to the source physical memory address and transitions the state to the reread state 610. The processing device rereads the data at the source and then proceeds to write to the destination physical memory address. This provides priority to host system operations and ensures data consistency. The state then transitions to the idle state 602.

If during the verify state 606, the host system 120 writes to the destination physical memory address (614), the host system write operation supersedes the internal write operation by the wear leveling operation. Accordingly, the internal write operation is canceled and the state transitions back to the idle state 602.

FIG. 6B illustrates a state data structure 620 used to maintain a state of the wear leveling operation, in accordance with some embodiments of the present disclosure. The state data structure can be a table, linked list, or the like. The state data structure 620 can be a content addressable memory. Although shown as a single data structure, the state data structure 620 can be separated into two data structures, one for the source addresses and one for the destination addresses.

As depicted, the state data structure 620 includes a tag 622, a source physical memory address (SPMA) 624, a destination physical memory address (DPMA) 626, and a state 628. The tag can be a numerical identifier that is assigned to each wear leveling operation being concurrently performed. For example, if there are 4 MoveBlock commands being executed for a wear leveling operation, there can be four entries in the state data structure 620 and the tags can include values 1, 2, 3, 4. The SPMA 624 can include the source physical memory address involved in the wear leveling operation. Likewise, the DPMA 626 can include the destination physical memory address that is involved in the wear leveling operation. The state 628 can include the state (e.g., idle, read, verify, write, reread) that the wear leveling operation is currently in.

When the host system 120 executes a write operation, the state data structure 620 can be checked to determine the state of the wear leveling operation being performed on the address requested by the host system 120. If there is a conflict, then the processing device can modify the state of the wear leveling operation to allow the host system 120 operation to proceed. For example, if the host system 120 issues a write command to the SPMA and the state of the wear leveling operation for the SPMA is verify state 606, then the processing device can allow the write operation of the host system 120 to proceed and can change the state of the wear leveling operation to reread 610.

Figure 7:
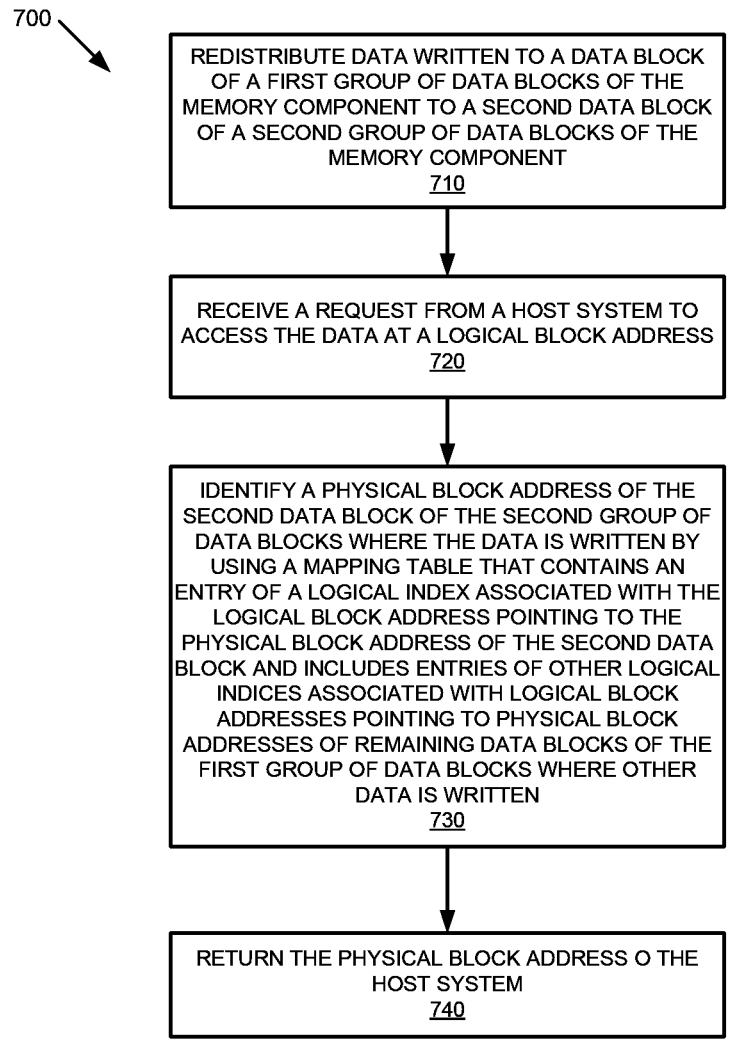
FIG. 7 is a flow diagram of an example method to handle requests to access data from a host system when the data has been redistributed from a first group of data blocks to a second group of data blocks, in accordance with some embodiments of the present disclosure.

FIG. 7 is a flow diagram of an example method 700 to handle requests to access data from the host system when the data has been redistributed from a first group of data blocks to a second group of data blocks, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the wear leveling management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 710, the processing device redistributes data written to a data block of a first group of data blocks of the memory component 112A to a second data block of a second group of data blocks of the memory component 112A. The redistribution can be an inter-SMU wear leveling operation or an intra-SMU wear leveling operation.

At block 720, the processing device receives a request from the host system 120 to access the data at a logical block address. In some embodiments, the request can be a write command to write data to the logical block address.

At block 730, the processing device identifies a physical block address of the second data block of the second group of data blocks where the data is written by using a mapping data structure that contains an entry of a logical index associated with the logical block address pointing to the physical block address of the second data block and includes entries of other logical indices associated with logical block addresses pointing to physical block addresses of remaining data blocks of the first group of data blocks where other data is written. The processing device can use one or more indicators in the mapping data structure to determine whether the data is stored at the first data block or at the second data block in response to receiving the request from the host system 120 to access the data at the logical block address. The processing device can determine a physical block address of the first data block or the second data block where the data is determined to be stored.

The processing device can maintain a state of an operation associated with redistributing the data written to the data block of the first group of data blocks of the memory component 112A to the second data block of the second group of data blocks. The state can be maintained in the state data structure 620. If there is a conflict at the address involved in the write operation from the host system 120 and the operation that redistributes the data, the processing device can modify the state of the redistribution operation.

At block 740, the processing device returns the physical block address to the host system 120. The host system 120 can use the physical block address to access the data.

Figure 8:
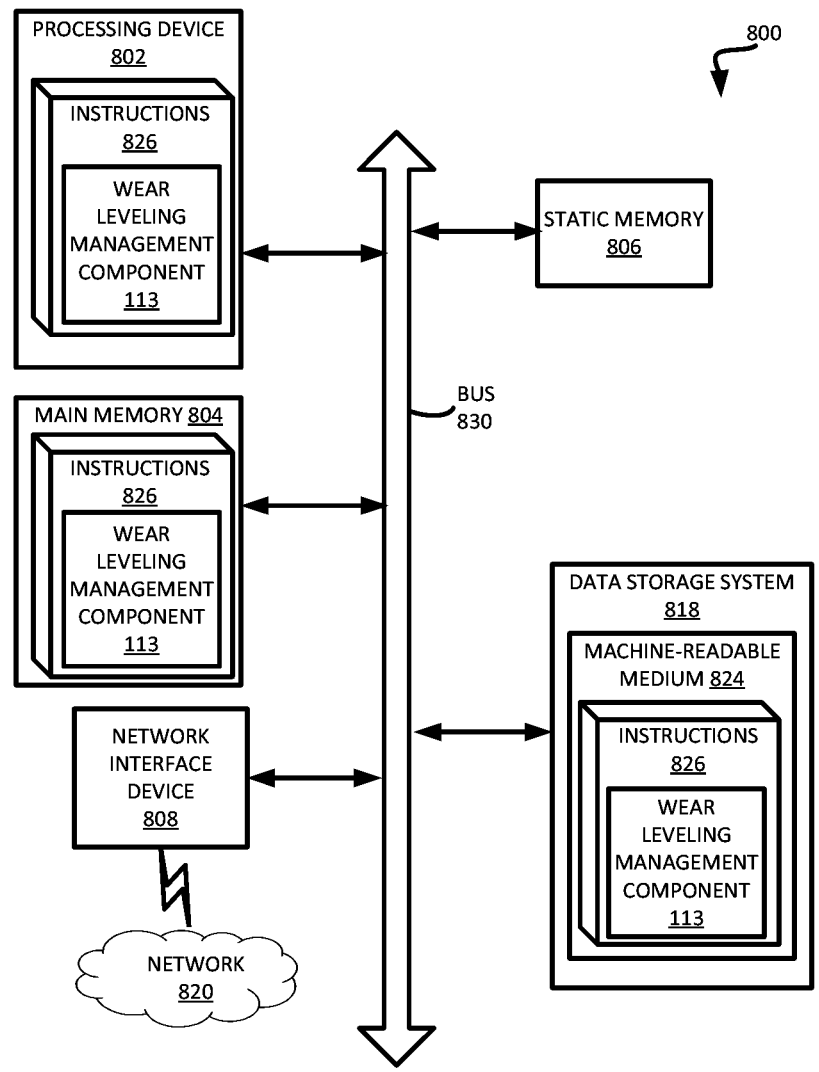
FIG. 8 is a block diagram of an example machine of a computer system in which implementations of the disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the wear leveling management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a component (e.g., the wear leveling management component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   maintaining a mapping data structure to track data movements from a plurality of data management units associated with a media management operation on a memory device; and
   using a first indicator and a second indicator of a plurality of indicators to indicate which data of data management units of a source group of data management units have been copied to a destination group of data management units during the media management operation, wherein:
   data located in data management units preceding the first indicator have been copied to data management units of the destination group of data management units;
   data located in data management units associated with the first indicator and the second indicator or between the first indicator and the second indicator are either copied to data management units of the destination group of data management units or remain located in data management units of the source group of data management units; and
   data located in data management units subsequent to the second indicator remain located in data management units of the source group of data management units and have not been copied to the destination group of data management units.

2. The method of claim 1, further comprising:
   determining whether the data located in the data management units between the first indicator and the second indicator have completed copying to the destination group of data management units based on respective flags associated with the data.

3. The method of claim 1, further comprising:
   determining that the source group of data management units satisfies a threshold wear condition pertaining to a number of write operations performed on data management units of the source group of data management units; and
   responsive to determining that the source group of data management units satisfies the threshold wear condition, performing the media management operation.

4. The method of claim 3, wherein performing the media management operation comprises copying data from a first data management unit of the source group of data management units to a second data management unit of the destination group of data management units.

5. The method of claim 4, further comprising:
   determining a logical address of the first data management unit; and
   moving, by a processing device, one or more indicators in the mapping data structure from the one or more entries associated with the first data management unit to another one or more entries in the mapping data structure that are subsequent to the one or more entries associated with the first data management unit.

6. The method of claim 5, further comprising:
   determining a state of the media management operation in response to a write operation to the logical address of the first data management unit from a host system; and
   modifying the state of the media management operation to enable the write operation from the host system to process.

7. The method of claim 4, further comprising:
   responsive to copying the data from the first data management unit of the source group of data management units to the second data management unit of the destination group of data management units, updating, in the mapping data structure, a logical index associated with the data of the first data management unit to reference a physical location of the second data management unit of the destination group of data management units.

8. A system comprising:
   a memory device; and
   a processing device, operatively coupled with the memory device, to perform operations comprising:

maintaining a mapping data structure to track data movements from a plurality of data management units associated with a media management operation on the memory device; and using a first indicator and a second indicator of a plurality of indicators to indicate which data of data management units of a source group of data management units have been copied to a destination group of data management units during the media management operation, wherein:

data located in data management units preceding the first indicator have been copied to data management units of the destination group of data management units;

data located in data management units associated with the first indicator and the second indicator or between the first indicator and the second indicator are either copied to data management units of the destination group of data management units or remain located in data management units of the source group of data management units; and data located in data management units subsequent to the second indicator remain located in data management units of the source group of data management units and have not been copied to the destination group of data management units.

9. The system of claim 8, wherein the processing device to perform further operations comprising:
determining whether the data located in the data management units between the first indicator and the second indicator have completed copying to the destination group of data management units based on respective flags associated with the data.

10. The system of claim 8, wherein the processing device to perform further operations comprising:
determining that the source group of data management units satisfies a threshold wear condition pertaining to a number of write operations performed on data management units of the source group of data management units; and
responsive to determining that the source group of data management units satisfies the threshold wear condition, performing the media management operation.

11. The system of claim 10, wherein performing the media management operation comprises copying data from a first data management unit of the source group of data management units to a second data management unit of the destination group of data management units.

12. The system of claim 11, wherein the processing device to perform further operations comprising:
determining a logical address of the first data management unit; and
moving, by a processing device, one or more indicators in the mapping data structure from the one or more entries associated with the first data management unit to another one or more entries in the mapping data structure that are subsequent to the one or more entries associated with the first data management unit.

13. The system of claim 12, wherein the processing device to perform further operations comprising:
determining a state of the media management operation in response to a write operation to the logical address of the first data management unit from a host system; and
modifying the state of the media management operation to enable the write operation from the host system to process.

14. The system of claim 11, wherein the processing device to perform further operations comprising:
responsive to copying the data from the first data management unit of the source group of data management units to the second data management unit of the destination group of data management units, updating, in the mapping data structure, a logical index associated with the data of the first data management unit to reference a physical location of the second data management unit of the destination group of data management units.

15. A non-transitory computer-readable storage medium comprising instructions that, when executed by a processing device, cause the processing device to perform operations comprising:
maintaining a mapping data structure to track data movements from a plurality of data management units associated with a media management operation on a memory device; and
using a first indicator and a second indicator of a plurality of indicators to indicate which data of data management units of a source group of data management units have been copied to a destination group of data management units during the media management operation, wherein:

data located in data management units preceding the first indicator have been copied to data management units of the destination group of data management units;

data located in data management units associated with the first indicator and the second indicator or between the first indicator and the second indicator are either copied to data management units of the destination group of data management units or remain located in data management units of the source group of data management units; and data located in data management units subsequent to the second indicator remain located in data management units of the source group of data management units and have not been copied to the destination group of data management units.

16. The non-transitory computer-readable storage medium of claim 15, the operations further comprising:
determining whether the data located in the data management units between the first indicator and the second indicator have completed copying to the destination group of data management units based on respective flags associated with the data.

17. The non-transitory computer-readable storage medium of claim 15, the operations further comprising:
determining that the source group of data management units satisfies a threshold wear condition pertaining to a number of write operations performed on data management units of the source group of data management units; and
responsive to determining that the source group of data management units satisfies the threshold wear condition, performing the media management operation.

18. The non-transitory computer-readable storage medium of claim 17, wherein performing the media management operation comprises copying data from a first data management unit of the source group of data management units to a second data management unit of the destination group of data management units.

19. The non-transitory computer-readable storage medium of claim 18, the operations further comprising:

determining a logical address of the first data management unit; and moving, by a processing device, one or more indicators in the mapping data structure from the one or more entries associated with the first data management unit to another one or more entries in the mapping data structure that are subsequent to the one or more entries associated with the first data management unit.

20. The non-transitory computer-readable storage medium of claim 19, the operations further comprising:

determining a state of the media management operation in response to a write operation to the logical address of the first data management unit from a host system; and modifying the state of the media management operation to enable the write operation from the host system to process.

\* \* \* \* \*